United States Patent
Demirdjian

(10) Patent No.: US 8,502,860 B2
(45) Date of Patent: Aug. 6, 2013

(54) ELECTRONIC CONTROL SYSTEM, ELECTRONIC CONTROL UNIT AND ASSOCIATED METHODOLOGY OF ADAPTING 3D PANORAMIC VIEWS OF VEHICLE SURROUNDINGS BY PREDICTING DRIVER INTENT

(75) Inventor: David Demirdjian, Somerville, MA (US)

(73) Assignee: Toyota Motor Engineering & Manufacturing North America (TEMA), Erlanger, KY (US)

( * ) Notice: Subject to any disclaimer, the term of this patent is extended or adjusted under 35 U.S.C. 154(b) by 918 days.

(21) Appl. No.: 12/569,182

(22) Filed: Sep. 29, 2009

(65) Prior Publication Data

US 2011/0074916 A1 Mar. 31, 2011

(51) Int. Cl.
*G06F 7/00* (2006.01)
*H04N 7/00* (2011.01)

(52) U.S. Cl.
USPC ........ 348/36; 348/148; 348/E13.001; 348/42; 701/36; 701/37; 701/38; 701/45

(58) Field of Classification Search
USPC .......... 348/36, 148, E13.001, 42; 701/36–38, 701/45
See application file for complete search history.

(56) References Cited

U.S. PATENT DOCUMENTS

| | | | |
|---|---|---|---|
| 4,625,329 A * | 11/1986 | Ishikawa et al. | 382/104 |
| 5,829,782 A * | 11/1998 | Breed et al. | 280/735 |
| 5,978,017 A | 11/1999 | Tino | |
| 6,539,288 B2 | 3/2003 | Ishida et al. | |
| 6,593,960 B1 | 7/2003 | Sugimoto et al. | |
| 6,690,299 B1 | 2/2004 | Suiter | |
| 6,795,111 B1 | 9/2004 | Mazzilli | |
| 6,850,629 B2 * | 2/2005 | Jeon | 382/104 |
| 6,917,693 B1 | 7/2005 | Kiridena et al. | |
| 7,034,861 B2 | 4/2006 | Okada et al. | |
| 7,050,606 B2 * | 5/2006 | Paul et al. | 382/104 |
| 7,139,412 B2 | 11/2006 | Kato et al. | |
| 7,145,519 B2 * | 12/2006 | Takahashi et al. | 345/7 |
| 7,184,073 B2 | 2/2007 | Varadarajan et al. | |
| 7,266,219 B2 | 9/2007 | Okamoto et al. | |
| 7,304,651 B2 | 12/2007 | Ishida et al. | |
| 7,327,225 B2 | 2/2008 | Nicholas et al. | |
| 7,359,527 B2 * | 4/2008 | Breed et al. | 382/100 |
| 7,365,653 B2 | 4/2008 | Yang et al. | |

(Continued)

OTHER PUBLICATIONS

U.S. Appl. No. 12/408,383, filed Mar. 20, 2009, Demirdjian et al.

*Primary Examiner* — Alina N Boutah
(74) *Attorney, Agent, or Firm* — Oblon, Spivak, McClelland, Maier & Neustadt, L.L.P.

(57) ABSTRACT

An electronic control system, electronic control unit and an associated methodology for adapting three dimensional panoramic views of vehicle surroundings by predicting driver intent are provided. A plurality of cameras mounted on a vehicle generate images of a surrounding area of the vehicle. A visual sensor detects a three dimensional profile of an occupant of the vehicle. An electronic control unit generates a three dimensional panoramic view based on the images generated by the plurality of cameras, determines three dimensional locations and orientations of a plurality of body parts of the occupant of the vehicle based on the three dimensional profile detected by the visual sensor, and adapts the three dimensional panoramic view based on the determined three dimensional locations and orientations. A display unit displays the adapted three dimensional panoramic view.

19 Claims, 8 Drawing Sheets

U.S. PATENT DOCUMENTS

| | | | |
|---|---|---|---|
| 7,370,883 B2 * | 5/2008 | Basir et al. | 280/735 |
| 7,394,356 B2 * | 7/2008 | Kumabe et al. | 340/436 |
| 7,406,181 B2 * | 7/2008 | O'Boyle et al. | 382/104 |
| 7,415,126 B2 * | 8/2008 | Breed et al. | 382/100 |
| 7,502,048 B2 | 3/2009 | Okamoto et al. | |
| 7,688,221 B2 * | 3/2010 | Watanabe et al. | 340/901 |
| 8,135,511 B2 * | 3/2012 | Demirdjian et al. | 701/36 |
| 2001/0003168 A1 * | 6/2001 | Breed et al. | 701/45 |
| 2001/0029416 A1 * | 10/2001 | Breed et al. | 701/45 |
| 2003/0021490 A1 * | 1/2003 | Okamoto et al. | 382/284 |
| 2003/0125855 A1 * | 7/2003 | Breed et al. | 701/36 |
| 2003/0209893 A1 * | 11/2003 | Breed et al. | 280/735 |
| 2004/0220705 A1 * | 11/2004 | Basir et al. | 701/1 |
| 2006/0088190 A1 | 4/2006 | Chinomi | |
| 2007/0010944 A1 | 1/2007 | Ferrebee, Jr. et al. | |
| 2007/0236563 A1 * | 10/2007 | Takagi et al. | 348/64 |
| 2008/0116680 A1 * | 5/2008 | Mita et al. | 280/801.1 |
| 2008/0266324 A1 | 10/2008 | Lynch et al. | |
| 2008/0267460 A1 * | 10/2008 | Aoki et al. | 382/118 |
| 2009/0079553 A1 | 3/2009 | Yanagi et al. | |
| 2009/0086019 A1 * | 4/2009 | Okabe et al. | 348/118 |
| 2010/0131148 A1 * | 5/2010 | Camhi et al. | 701/29 |

* cited by examiner

ELECTRONIC CONTROL SYSTEM, ELECTRONIC CONTROL UNIT AND ASSOCIATED METHODOLOGY OF ADAPTING 3D PANORAMIC VIEWS OF VEHICLE SURROUNDINGS BY PREDICTING DRIVER INTENT

BACKGROUND

An electronic control system, electronic control unit and associated methodology are provided. More particularly, an electronic control system, electronic control unit and associated methodology are provided to adapt three dimensional (hereinafter "3D") panoramic views of vehicle surroundings by predicting driver intent based on a three dimensional profile of an occupant of a vehicle.

It is known to use images from multiple cameras mounted on a vehicle to create a panoramic view from a virtual viewpoint (i.e., a synthesized image) and to change the synthesized image based on the direction of the vehicle.

However, these systems do not alter a 3D modeling surface or change the viewpoint perspective of a panoramic reconstruction on a 3D surface to enlarge an area of potential danger that was identified as a result of predicting driver intent based on a three dimensional profile of an occupant of a vehicle and potential risks.

SUMMARY OF EXEMPLARY ASPECTS OF THE ADVANCEMENTS

In one aspect, an electronic control system is provided for adapting three dimensional panoramic views of vehicle surroundings by predicting driver intent. The electronic control system includes a plurality of cameras, a visual sensor, an electronic control unit and a display device. The plurality of cameras are mounted on a vehicle and generate images of a surrounding area of the vehicle. The visual sensor detects a three dimensional profile of an occupant of the vehicle. The electronic control unit generates a three dimensional panoramic view based on the images generated by the plurality of cameras, determines three dimensional locations and orientations of a plurality of body parts of the occupant of the vehicle based on the three dimensional profile detected by the visual sensor, and adapts the three dimensional panoramic view based on the determined three dimensional locations and orientations. The display unit displays the adapted three dimensional panoramic view.

In another aspect, a method for adapting three dimensional panoramic views of vehicle surroundings by predicting driver intent is provided. The method includes generating images of a surrounding area of a vehicle with a plurality of cameras mounted on the vehicle, and detecting a three dimensional profile of an occupant of the vehicle with a visual sensor mounted on the vehicle. A three dimensional panoramic view is generated based on the images generated by the plurality of cameras. Three dimensional locations and orientations of a plurality of body parts of the occupant of the vehicle are determined based on the three dimensional profile detected by the visual sensor. The three dimensional panoramic view is then adapted based on the determined three dimensional locations and orientations, and the adapted three dimensional panoramic view is displayed.

In a further aspect, an electronic control unit for adapting three dimensional panoramic views of vehicle surroundings by predicting driver intent is provided. The electronic control unit includes a data acquisition interface, a data processor, and a control interface. The data acquisition interface is configured to receive a plurality of images of a surrounding area of the vehicle and a three dimensional profile of an occupant of a vehicle. The data processor is configured to generate a three dimensional panoramic view based on the plurality of images, is configured to determine three dimensional locations and orientations of a plurality of body parts of an occupant of a vehicle based on the three dimensional profile, and is configured to adapt the three dimensional panoramic view based on the determined three dimensional locations and orientations. The control interface is configured to send display information corresponding to the adapted three dimensional panoramic view.

In a further aspect, an electronic control system for calibrating cameras used to generate three dimensional panoramic views of vehicle surroundings is provided. The electronic control system includes a plurality of cameras, a plurality of calibration markers and an electronic control unit. The plurality of cameras are mounted on a vehicle and generate images of a surrounding area of the vehicle. The plurality of calibration markers are mounted on a body of the vehicle. The electronic control unit is configured to generate a three dimensional panoramic view based on the images generated by the plurality of cameras, and is configured to calibrate the plurality of cameras by detecting the calibration markers in the images generated by the plurality of cameras.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Certain terminology used in the following description is for convenience only and is not limiting. The term "body part" as used herein refers to any element of the human body that exhibits at least one degree of freedom relative to adjacent body elements. For example, this may include, but is not limited to, the arms, forearms, hands, fingers, head, torso, legs, or feet.

I. System

A system in accordance with an exemplary aspect of the disclosure provides a driver a global and compact view of the surroundings of his or her vehicle. Views from a set of cameras placed on and around the vehicle (e.g. front, back, left and right) are merged together to create a full 360 degree panorama which is displayed on a video screen that can be, for example, placed on a vehicle dashboard. A standard panorama is a large 2D image obtained by stitching together multiple views. To provide the driver a more realistic view, the 2D panorama is projected onto a 3D surface which is shown to a driver of the vehicle with a perspective effect. Context information can then used to modify the panorama (the shape of 3D surface or a perspective from which the surface is viewed) to offer more resolution for the views of interest. Context information includes the driver's intentions relating to current and future operation of the vehicle (e.g. turning, passing another vehicle) or potential risks (e.g. presence of another vehicle close to the driver's vehicle).

Figure 1:
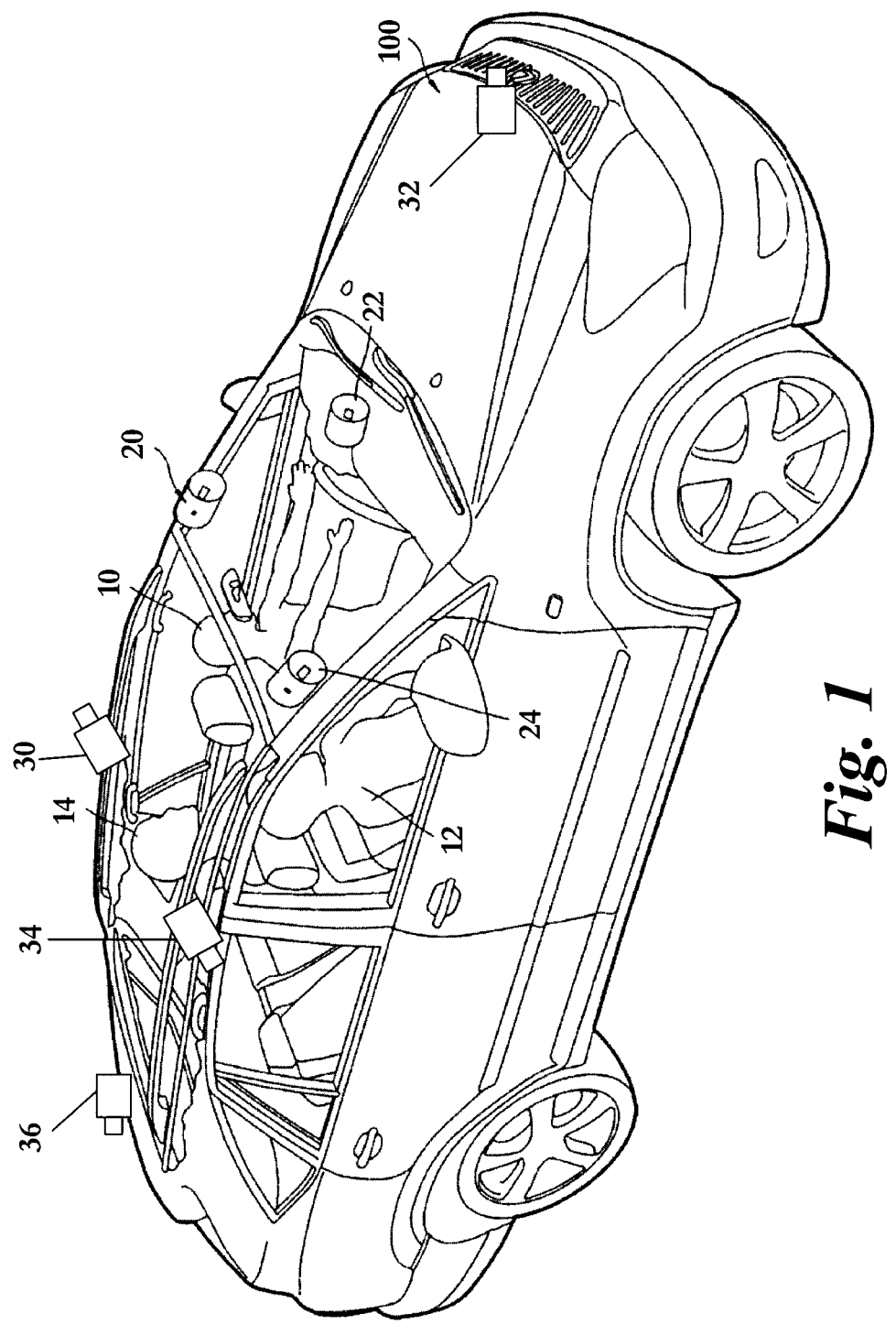
FIG. 1 illustrates a vehicle that includes cameras and visual sensors in accordance with an exemplary aspect of the disclosure.

Referring now to the drawings, wherein like reference numerals designate identical or corresponding parts throughout the several views, FIG. 1 illustrates a vehicle 100 that includes a system in accordance with an exemplary aspect of the disclosure. In FIG. 1, the vehicle 100 is operated by a vehicle occupant 10. Vehicle occupants 12 and 14 are passengers in vehicle 100.

Figure 10:
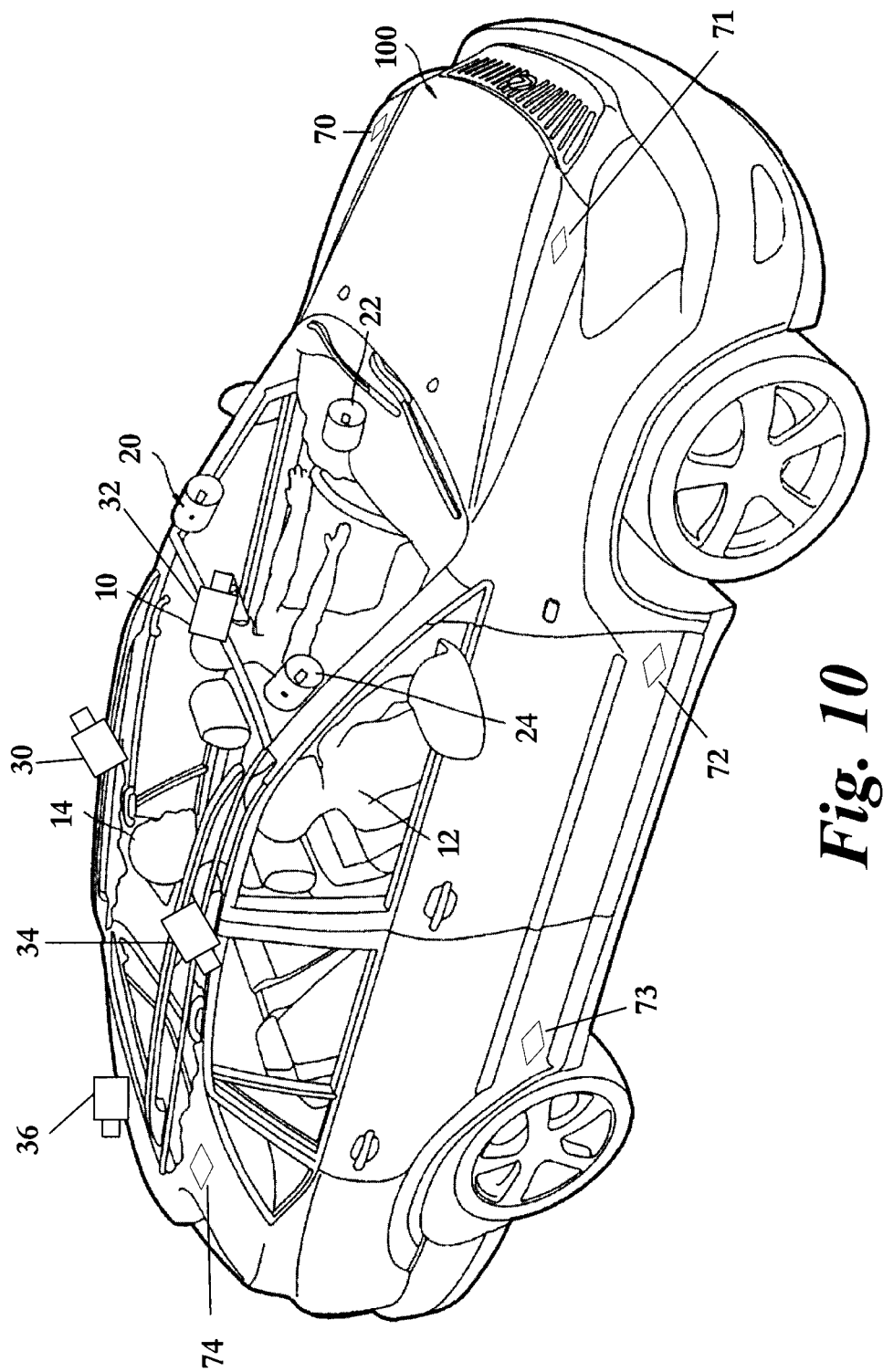
FIG. 10 illustrates a vehicle that includes calibration markers in accordance with another exemplary aspect of the disclosure.

The vehicle 100 illustrated in FIG. 1 includes a set of four cameras (30, 32, 34 and 36) cameras placed on and around the vehicle. Although four cameras provide a useful panorama (left, front, right and back), there can be more cameras. The configuration of the cameras 30, 32, 34 and 36 (e.g. location, focal length) are defined so that each camera has a part of the driver's vehicle in its field of view. This can, for example, provide the driver with an idea of how far other objects in the images are from the vehicle. The cameras 30, 32, 34 and 36 use a focal length such that each camera has a useful field of view to the left, front, right and back. For example, it may not be necessary, in some circumstances, for a camera to see objects much higher than a standard vehicle. In addition, the fields of view of the cameras 30, 32, 34 and 36 do not necessarily have to overlap with each other. The specific locations of each of the cameras in FIG. 1 is for illustration purposes only, and one of ordinary skill in the art will recognize several other possible camera mounting locations are possible to achieve the desired effect. For example, FIG. 10 illustrates the camera 32 with a field of view to the front of the vehicle 100 that is mounted above the windshield of the vehicle 100, whereas FIG. 1 illustrates camera 32 mounted on the hood of the vehicle 100 with a field of view to the front of the vehicle 100.

The vehicle 100 illustrated in FIG. 1 further includes visual sensors 20, 22 and 24. The visual sensors 20, 22 and 24 can be, for example, 3-D cameras that operate on the time-of-flight principle. For example, a 3-D camera can include an internal lighting source that emits Near-Infrared light which is back-scattered to a sensor in the camera by objects in the vehicle. The time of arrival can then be measured independently by each of a plurality of a sensor pixels within the camera. Based on this information, a complete distance map of all objects in the field of view can be obtained on a pixel-by-pixel basis, where each pixel (X, Y) constitutes a 3-D point M=(X, Y, Z) in a real-world coordinate system with the sensor at the origin.

However, other visual sensors that detect three dimension information can be used, and the visual sensors 20, 22 and 24 need not be limited to the above-described configuration. Moreover, although three visual sensors are illustrated in FIG. 1, the present invention can be performed by one or a plurality of visual sensors.

Figure 2:
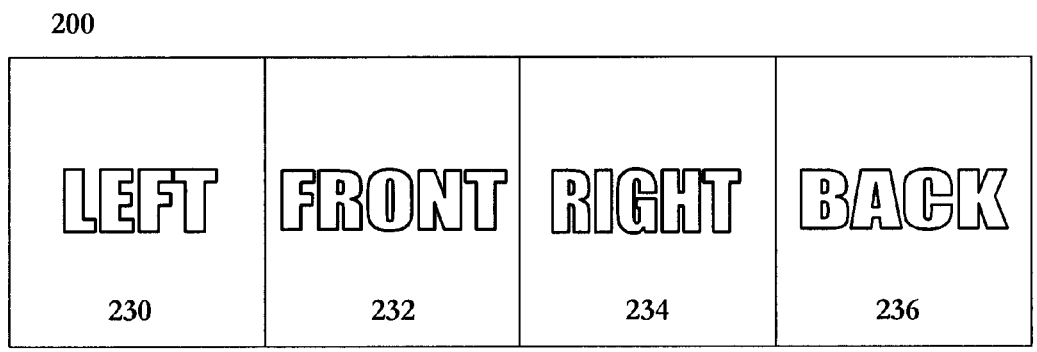
FIG. 2 illustrates a two dimensional (hereinafter "2D") panoramic reconstruction obtained by stitching together multiple camera views.

As noted above, the system provides the driver with a 2D panorama that is projected on a 3D surface which is shown to a driver of the vehicle with a perspective effect. FIG. 2 illustrates a 2D panoramic reconstruction 200 obtained by stitching together views from each of cameras 30, 32, 34 and 36 illustrated in FIG. 1. The 2D panoramic reconstruction 200 includes a left image 230 generated by the camera 30 mounted on a left side of the vehicle 100, a front image 232 generated by the camera 32 mounted on a front of the vehicle 100, a right image 234 generated by the camera 34 mounted on a right side of the vehicle 100 and a back image 236 generated by the camera 36 mounted on a back of the vehicle 100.

2D reconstruction can be achieved by concatenating together images produced by the cameras 30, 32, 34 and 36. Although concatenation can be simple it can also provide inaccurate panoramas. For example, if the same object is seen by overlapping cameras, the object will appear twice in the final panorama. Thus, a more exact method uses camera calibration information for stitching together all images in a more realistic way. Calibration of the cameras will be discussed in greater detail below. The calibration includes computing the image transformation that maps each original camera view to the panoramic reconstruction.

Figure 3:
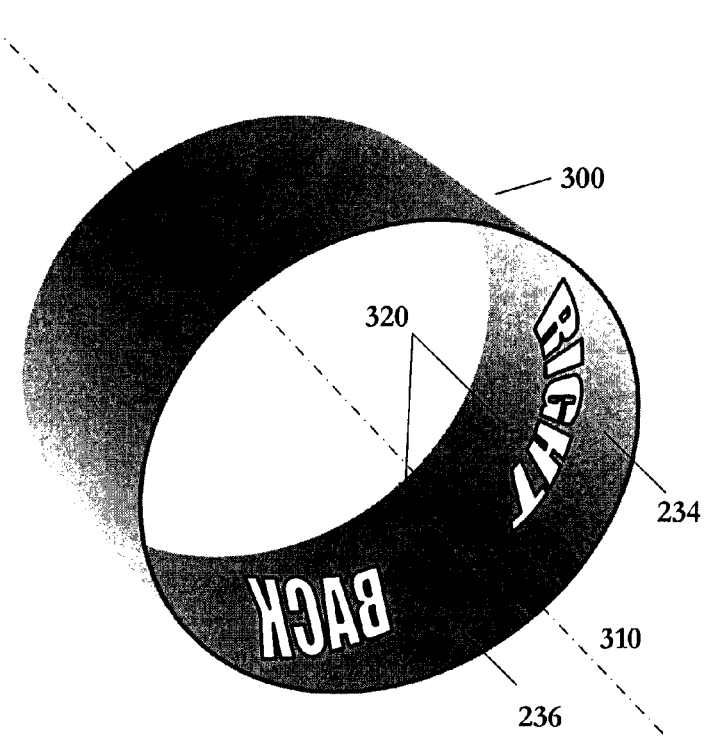
FIG. 3 illustrates the 2D panoramic reconstruction illustrated in FIG. 2 projected onto a 3D surface.

As illustrated in FIG. 3, the 2D panoramic reconstruction 200 is then projected onto a 3D surface. In the present example, the 3D surface is a hollow cylinder 300 that includes a centerline 310 and an interior surface 320. However, any number of other 3D shapes, such as a polygon, box, bowl, etc., can also be employed instead of a cylinder. The 2D panoramic reconstruction 200 is projected onto the interior surface 320 of the hollow cylinder 300 so as to generate images of the left, front, right and back views on the three dimensional surface of the cylinder 300. For example, projections of right image 234 from the right side camera 34 and back image 236 from the back side camera 36 are visible in FIG. 3.

A panoramic projection can provide a global and compact view of a vehicle's surroundings to the driver of the vehicle. Displaying the panorama directly in front of the driver might radically change the way the driver visually checks around his or her vehicle while operating the vehicle. Such a system can be particularly useful for maneuvering the vehicle when changing lanes, passing other vehicles or attempting to merge into traffic.

Figure 4A:
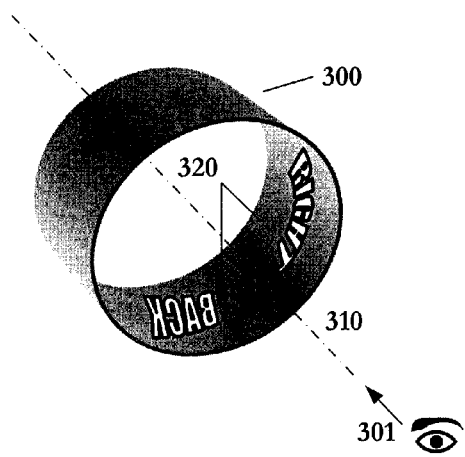
FIGS. 4*a*-4*b* illustrate displaying the 3D surface of FIG. 3 using a perspective effect from a first viewpoint.
Figure 4B:
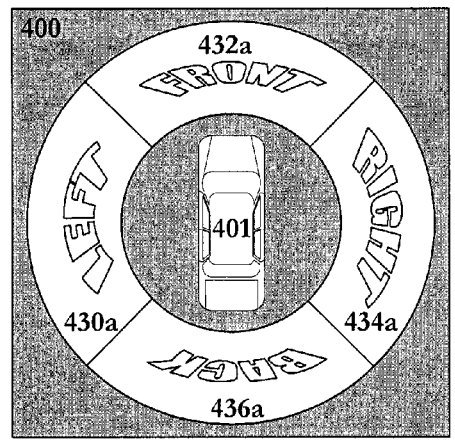

FIG. 4a-4d illustrates one example of how the 3D surface 300 of FIG. 3 can be displayed to the driver 100 using a perspective effect. FIG. 4b illustrates a display 400 that is mounted in the interior of the vehicle 100 in order to provide a compact view of the 3D surface 300 the driver 10. As an example, the display 400 can be a video screen placed in front of the driver 10 on an instrument panel next to speed and fuel indicators. The display 400 includes a virtual vehicle representation 401 of the vehicle 100 so as to provide the driver 10 with context for the information that is provided. The display 400 additionally includes a perspective view of the 3D surface 300. As can be seen in FIG. 4a, a virtual viewpoint 301 is taken along the centerline 310 of the cylinder 300. The image that results from the virtual viewpoint 301 is then displayed on the display 400 around the virtual vehicle representation 401 as a left image 430a, a front image 432a, a right image 434a and a back image 436a. In this manner, the display 400 displays a panoramic image of the surroundings of the vehicle 100 as a 'closed' surface that provides an observer with spatial context as to how the images 430a, 432a, 434a and 436a relate to the vehicle 100. By contrast, in a standard 2D panorama, the left and right sides usually correspond to the same object or physical location but can difficult for an observer to correctly register with respect to a particular viewpoint.

The present example also employs context information to modify the 3D panoramic view displayed to the driver to offer more resolution for views of particular interest. In the present example, context information includes a driver's intentions or potential risks. A driver's intention can be any intention to perform a current or future action relating to operation of the vehicle 100. For example, these intentions can include turning, passing a vehicle or merging into traffic. Potential risks include risks that relate to the vehicle's proximity to other objects, such as another vehicle close to the vehicle 100.

Figure 4C:
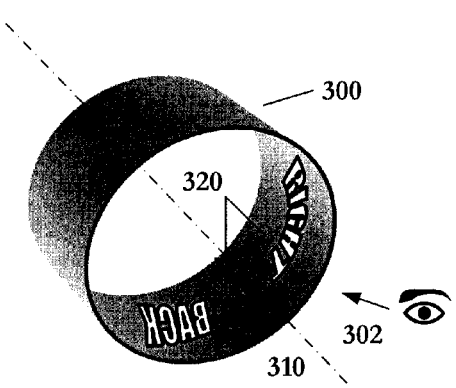
FIGS. 4*c*-4*d* illustrate displaying the 3D surface of FIG. 3 using a perspective effect from a second viewpoint.
Figure 4D:
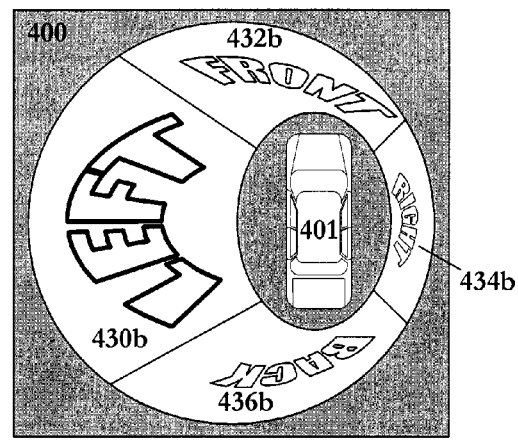

FIGS. 4c and 4d illustrate one example of how the display 400 can be modified to illustrate an area of interest. In the example in FIGS. 4c and 4d, an area to the left of the vehicle 100 is an area of interest. The display 400 is altered by changing the viewpoint from the virtual viewpoint 301 illustrated in FIG. 4a to the virtual viewpoint 302, illustrated in FIG. 4c. The virtual viewpoint 4c is directed towards a portion of the interior surface 320 of the cylinder 300 that supports a projected image (not illustrated) from the left side camera 30. The resulting image on the display 400 is shown in FIG. 4d, and includes a left image 430b, a front image 432b, a right image 434b and a back image 436b. The left image 430b in FIG. 4d is shown with greater resolution than the left image 430a in FIG. 4b, whereas each of the images 432b, 434b and 436b in FIG. 4d have a smaller resolution than the images 432a, 434a and 436a, respectively, in FIG. 4b. Thus, the driver 10 of the vehicle 100 is provided with more resolution for the view of interest (the left side) and less resolution for those views that are not of interest (the front, right and back side). Although the present example illustrates modifying a 3D panoramic view displayed to the driver by changing a virtual viewpoint used to generate the display image, it is also possible to modify the 3D panoramic view by changing the shape onto which the 2D panoramic reconstruction 200 is projected.

II. Hardware

Figure 5:
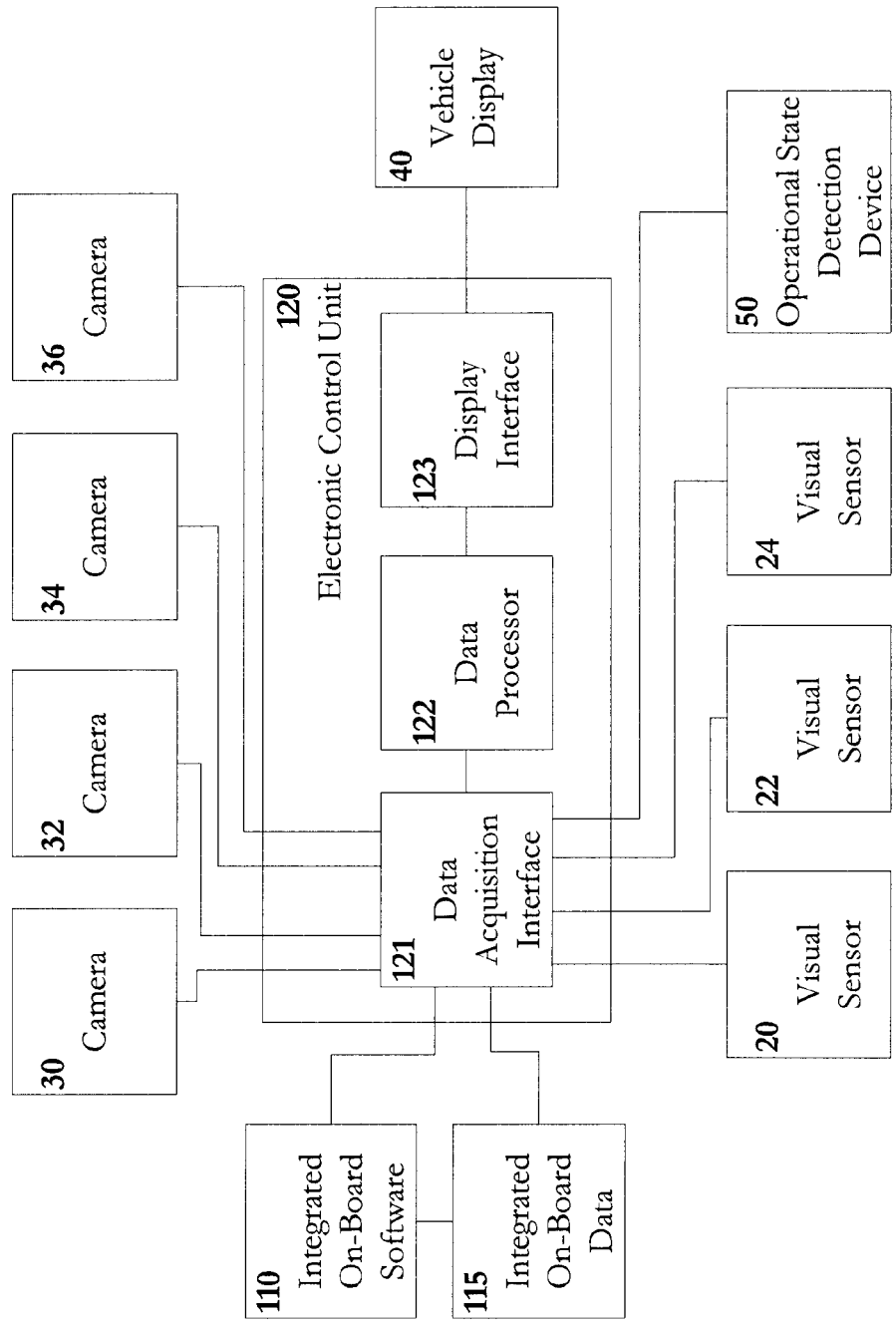
FIG. 5 illustrates a high level block diagram of a display system in accordance with an exemplary aspect of the disclosure.

FIG. 5 illustrates an electronic display system in accordance with an exemplary aspect of the disclosure. The electronic display system includes an electronic control unit 120. Electronic control unit 120 includes a data acquisition interface 121, a data processor 122 and a display interface 123. The electronic control unit may be located in an engine control unit or may be a stand alone device within another portion of the vehicle. The data acquisition interface 121 may employ, for example, wireless or hard wired connections. The data acquisition interface may be operably connected to any number or combination of vehicle mounted sensors such as, the visual sensors 20, 22 and 24, cameras 30, 32, 34 and 36 and one or more operational state detection device 50. The operation state detection device 50 can include any sensor or device that indicates a vehicle state, such as use of blinkers (turn indicators), the vehicle is in reverse mode, operation of the brakes, operation of the accelerator, and vehicle speed, for example. The data acquisition interface 121 is configured to send the acquired data to a data processor 122.

The data processor 122 may be any component known to those skilled in the art that interprets and executes an instruction set. For example, the data processor 122 may be a AMD EPSILON 64®, a multicore processor, a dedicated application specific integrated circuit (ASIC), a programmable logic device (PLD) or even discrete logic components. The data processor 122 includes an algorithm that estimates the three dimensional location and orientation of the body parts of the vehicle occupants as well as their dynamics (velocity and acceleration). The algorithm can also estimate passenger body-pose. The data processor 122 is configured to send commands to the display interface 123. The data processor 122 also includes an algorithm that generates a 2D panoramic reconstruction based on multiple images from is obtained from the cameras 30, 32, 34 and 36, projects the 2D reconstruction onto a 3D surface and generates display information of the resulting 3D panoramic image based on a virtual viewpoint. The display interface 123 sends display information to a vehicle display 40. In one example, the vehicle display 40 can be realized in the form of the display 400, illustrated in FIGS. 4b and 4d. In addition, the display interface 123 may communicate with other systems in addition to those illustrated in FIG. 5.

Although the connections between various elements depicted in FIG. 5 are shown as hardwired implementations, these connections are equally applicable to wireless implementations. In addition, although FIG. 5 depicts three visual sensors 20, 22 and 24 and four cameras 30, 32, 34 and 36, the system according to the present invention can employ any number of visual sensors and cameras. Likewise, although FIG. 5 illustrates a single operational state detection device 50, the system according to the present invention can receive data from a operational state detection device, plural operational state detection device or no operational state detection device. In addition, as will be readily understood by one of ordinary skill in the art, the data acquisition interface can receive information from sensors in addition to the sensors illustrated in FIG. 5.

FIG. 5 also depicts integrated on-board software 110 and integrated on-board data 115. Although these elements are shown outside of the electronic control unit 120, they may also be incorporated in the electronic control unit 120. The on-board data 115 may be, for example, stored information regarding vehicle operational states, occupant information and pose models and driver intent information.

III. Methodology

Figure 6:
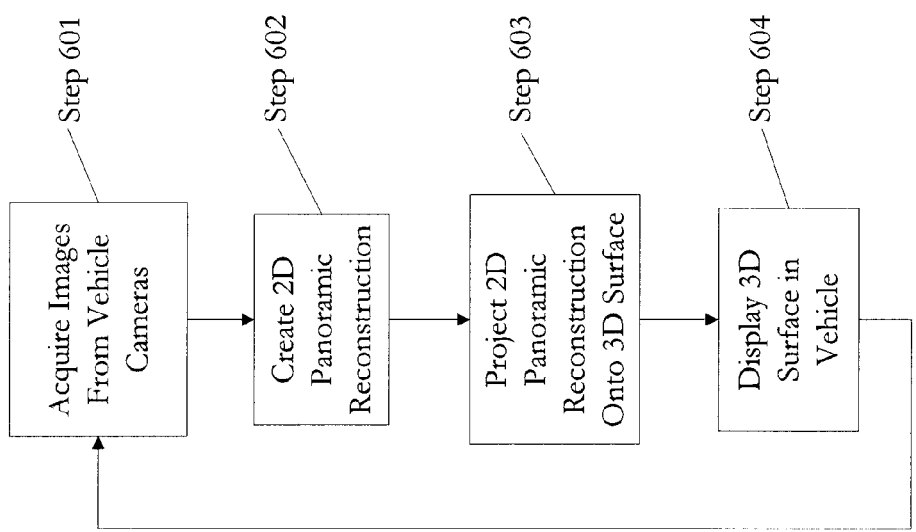
FIG. 6 is a flow chart of a methodology for displaying 3D panoramic views of vehicle surroundings in accordance with an exemplary aspect of the disclosure.

An exemplary methodology of displaying panoramic views of vehicle surroundings will now be explained with reference to FIG. 6. At step 601, images are acquired from vehicle cameras. For example, the cameras 30, 32, 34 and 36 illustrated in FIG. 1 respectively acquire left, front, right and back images of the areas surrounding the vehicle 100 and send the images to the data acquisition interface 121 of the engine control unit 120. At step 602, a 2D panoramic reconstruction is created. For example, the data acquisition interface 121 sends the acquired images to the data processor 122 where a 2D panoramic reconstruction 200, as illustrated in FIG. 2, can be obtained by stitching together views from each of cameras 30, 32, 34 and 36 illustrated in FIG. 1. At step 603, the 2D panoramic reconstruction is projected on a 3D surface. For example, the data processor 122 projects the 2D panoramic reconstruction onto the interior surface 320 of the cylinder 300 illustrated in FIG. 3 so as to generate images of the left, front, right and back views on the three dimensional surface of the cylinder. At step 604, the resulting 3D panoramic image is displayed in the vehicle. For example, as illustrated in FIGS. 4a and 4b, a view of the cylinder 300 from a virtual viewpoint 301 is generated in the in the data processor 122 and then sent to the display interface 123, which then sends display information to the display 400. The display 400 then displays the resulting images around a virtual vehicle representation 401 as a left image 430a, a front image 432a, a right image 434a and a back image 436a.

Figure 7:
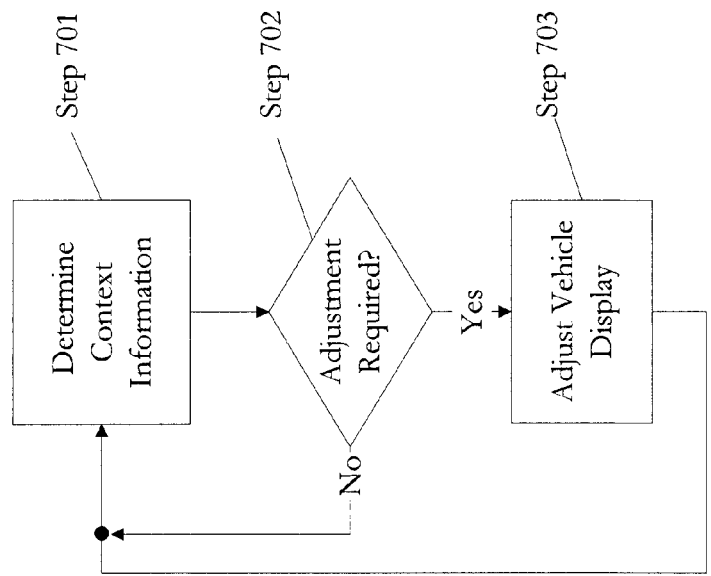
FIG. 7 is a flow chart of a methodology for adapting 3D panoramic views of vehicle surroundings in accordance with an exemplary aspect of the disclosure.

An exemplary methodology of adapting the display of 3D panoramic views of vehicle surroundings will now be explained with reference to FIG. 7. In step 701, context information is determined. As discussed above, context information includes a driver's intentions or potential risks. A driver's intention can be any intention to perform a current or future action relating to operation of the vehicle 100. For example, these intentions can include turning, passing a vehicle or merging into traffic. The driver's intent can be determined by detecting the operational state of any number of the vehicle's systems via the operational state detection device 50. For example, the operational state device 50 may detect the activation of a right turn indicator, which can be used to determine the driver desires to turn to the right. In another example, the operational state detection device 50 detects a shift lever selection so as to determine whether the driver intends to drive a vehicle forward or in reverse. Likewise, operation of the brakes, operation of the accelerator and vehicle speed are examples of operation states that can be detected by the operational state detection device 50 in order to determine a driver's intent. As explained in further detail below, computer vision technology can also be used to determine a driver's intent. For example, the visual sensors 20, 22 and 24 illustrated in FIG. 1 observe the driver 10 and computer vision algorithms predict the driver's intention based on data from the visual sensors.

Potential risks include risks that relate to the vehicle's proximity to other objects, such as another vehicle close to the vehicle 100. Presence of risk on or off the road can be estimated by using object recognition technology to detect vehicles and pedestrians around the driver's vehicle based on the images generated by the cameras 30, 32, 34 and 36.

In step 702, it is determined whether is necessary to make an adjustment to the display of the 3D panoramic views of vehicle surroundings. In the present example, it is assumed that the default display corresponds to that shown in FIG. 4b, in which each of the left, front, right and back views are illustrated with equal resolutions respectively as images 430a, 432a, 434a and 436a. If the context information determined at step 701 does not indicate that a particular area around the vehicle requires more of the driver's attention than the other areas, the result at step 702 is negative, and the routine begins again at step 701.

On the other hand, if the context information determined in Step 701 indicates that a particular area around the vehicle requires more of the driver's attention than the other areas, it is determined that an adjustment is required at step 702, and the method proceeds to step 703. For example, if the operational state detection device 50 detects that the left turn signal has been activated, that information is received by the data acquisition interface 121, which then passes the information to the data processor 122. The data processor 122 may then determine that the view to the left of the vehicle is an area of immediate interest to the driver. At step 703, the vehicle display is adjusted to emphasize the area of interest identified in step 702. For example, the vehicle display can be altered to that shown in FIG. 4d, in which an area to the left of the vehicle 100 is an area of interest. The display 400 is altered by changing the viewpoint from the virtual viewpoint 301 illustrated in FIG. 4a to the virtual viewpoint 302, illustrated in FIG. 4c. The virtual viewpoint 4c is directed towards a portion of the interior surface 320 of the cylinder 300 that supports a projected image (not illustrated) from the left side camera 30. The resulting image on the display 400 is shown in FIG. 4d, and includes a left image 430b, a front image 432b, a right image 434b and a back image 436b. The left image 430b in FIG. 4d is shown with greater resolution than the left image 430a in FIG. 4b, whereas each of the images 432b, 434b and 436b in FIG. 4d have a smaller resolution that the images 432a, 434a and 436a, respectively, in FIG. 4b. Thus, the driver 10 of the vehicle 100 is provided with more resolution for the view of interest (the left side) and less resolution for those views that are not of interest (the front, right and back side).

Figure 9:
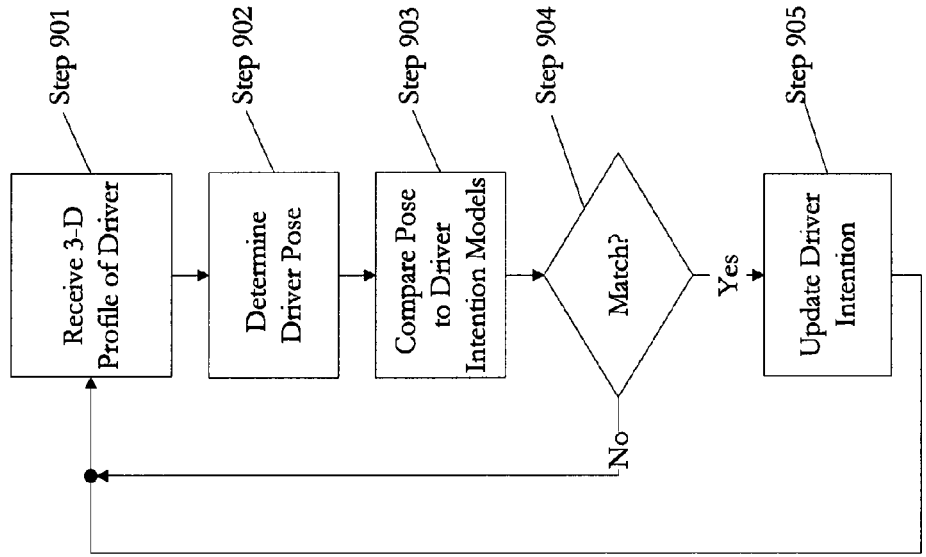
FIG. 9 is a flow chart of a methodology for predicting a driver's intent in accordance with an exemplary aspect of the disclosure.
Figure 8:
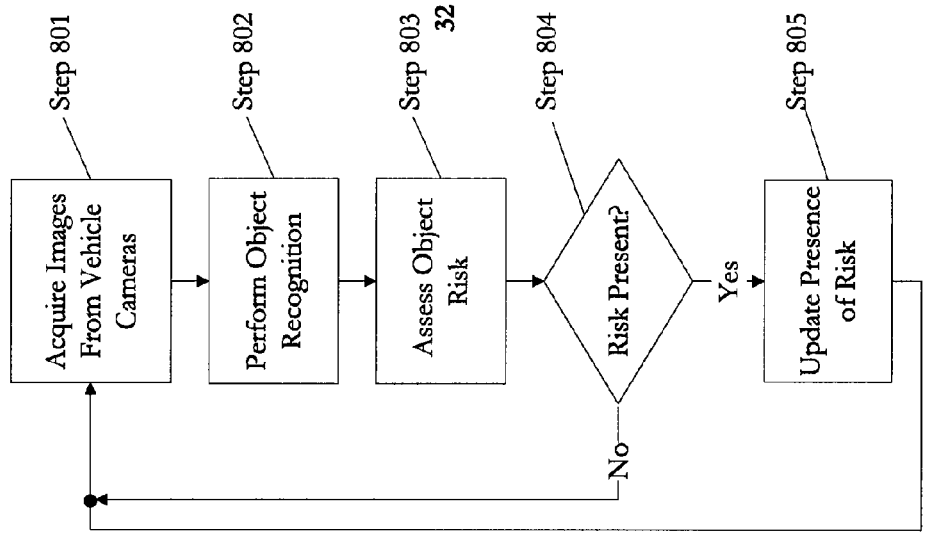
FIG. 8 is a flow chart of a methodology for assessing potential risks associated with a vehicle's operation in accordance with an exemplary aspect of the disclosure.

FIGS. 8 and 9 illustrate example methodologies for determining particular kinds f context information that are used to determine whether an area of particular interest to a vehicle driver exists. FIG. 8 illustrates a flow chart of a methodology for assessing potential risks associated with a vehicle's operation based on images acquired from the cameras 30, 32, 34 and 36; and FIG. 9 illustrates a flow chart of a methodology for predicting a driver's intent based on the visual sensors 20, 22 and 24.

Beginning with FIG. 8, at step 801, images are acquired from cameras mounted on a vehicle. For example, images are acquired by the cameras 30, 32, 34 and 36 mounted on the vehicle 100 illustrated in FIG. 1 and sent to the data acquisition interface 121 of the electronic control unit 120 illustrated in FIG. 5. At step 802, object recognition is performed followed by an object risk assessment at step 803. For example, the data acquisition interface 121 sends the images to the data processor 122 which then performs image recognition algorithms to determine if any of the images include an object of interest in the field of view of the cameras 30, 32, 34 and 36. Objects of interest can include pedestrians, vehicles, or any object that is part of the terrain or otherwise that is large enough to warrant a change in the maneuvering or operation of the vehicle 100. The data processor 122 can then perform a risk assessment algorithm that determines whether an object presents a hazard that warrants the driver's attention. This algorithm may consider, but is not limited to, an assessment of the size, relative speed to or proximity to the vehicle 100. Step 804 then determines whether a risk is present. This determination can be made based on a reference threshold limit that is compared to a scored result of objects that are detected in step 802 and then scored in step 803. If a negative result is returned, the routine begins again at step 801. If, however, a positive result is returned, the presence of risk is updated at step 805, and the context information used to determine whether it is necessary to display of 3D panoramic views of vehicle surroundings is updated accordingly.

An exemplary methodology of predicting a driver's intent based on the visual sensors will now be explained with reference to FIG. 9. At step 901, a visual sensor detects a three dimensional profile of a vehicle occupant. For example, at least one of the visual sensors 20, 22 and 24 illustrated in FIG. 1 detects a three dimensional profile of the driver 10. At step 902, the driver's pose and the dynamics (velocity/acceleration) are determined based on the three dimensional location and orientation of the body parts of the driver. At step 903, the detected pose and dynamics are compared to stored models of poses and dynamics that indicate various intentions of a driver. For example, a driver that turns her face to the left may be an indication of a desire to turn left. Although the models can be stored in advance, they may also be learned based on continued driver behavior. At step 904, it is determined whether the detected pose and dynamics matches any of the stored poses or dynamics. If there is no match, the routine begins again at step 901. However, if there is a match, the driver's intention is updated at step 905, and the context information used to determine whether it is necessary to display of 3D panoramic views of vehicle surroundings is updated accordingly.

IV. Calibration

As mentioned above, calibrating the cameras 30, 32 34 and 36 can be useful for producing a better a panoramic reconstruction. Estimating the location, orientation and focal length of the cameras are all helpful aspects of calibration. Calibration can be achieved using a reference object such as a calibration grid. This type of calibration is typically done only once, before a first use, unless cameras are moved at a different location on the vehicle. However, this technique can be subject to degradation over time as the cameras do, indeed, move over time due to events such as vehicle vibrations and changes in temperature (which may affect the camera lens). Even the slightest variation in camera location can ultimately affect the quality of the panoramic image that is produced. Such a variation could result in a misalignment between adjacent views when they are stitched together.

In the present example, calibration is continuously performed using visual markers on the vehicle. Such visual markers can be detected by multiple cameras in order to assist in creating a correlation between two views. The correlation between views is helpful to generate a panoramic view from images from the respective cameras. Specifically, a panorama is a fusion of multiple images, and utilizing the markers will produce a better panorama.

Figure 11:
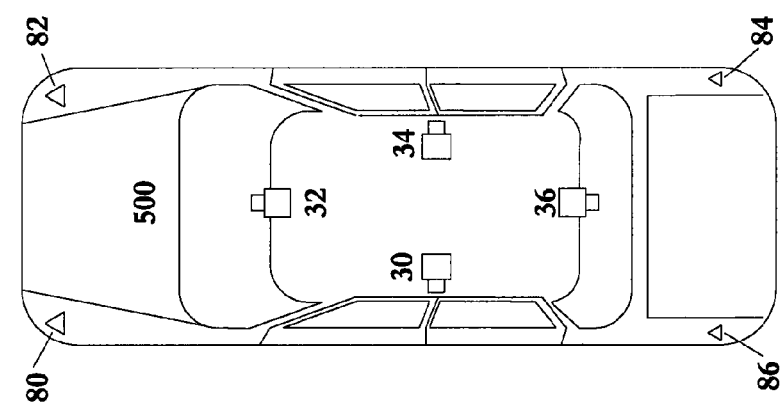
FIG. 11 illustrates another vehicle that includes calibration markers in accordance with another exemplary aspect of the disclosure.

FIG. 10 illustrates an example in which the vehicle 100 includes visual markers 70, 71, 72, 73 and 74. Although not illustrated, corresponding markers are positioned on the left side and back of the vehicle 100. The calibration markers can also be place in less conspicuous locations, such as near reflectors or the lights on the vehicle body. The goal of the calibration is to know the relative orientation and location of each camera. To this end, the markers are positioned such that each of the cameras 30, 32, 34 and 36 can see at least two of the markers and such that adjacent cameras can view at least one marker in common. For example, as illustrated in FIG. 11, the cameras 36 and 34 have overlapping fields of view such that both cameras can see the marker 84. Likewise, the cameras 34 and 32 have overlapping fields of view such that both cameras can see the marker 82. In another example it is possible to utilize markers that are not found in overlapping fields of view so long as the position of each marker is known relative to all of the other markers.

The markers can be a specific color that reflects enough light and has enough contrast with the background on which the marker is mounted so as to aid in detection of the markers in each image. For example, the markers can be white or yellow in color. Each marker also includes a specific geometry that includes more than a single point. For example, each of the markers in FIG. 10 is a polygon with four sides. The markers 71-74 in FIG. 10 can each be detected as four distinct points (the corners of the quadrilateral). However, the shape of the markers is not limited to this shape. For example, in FIG. 11, four triangular markers 80, 82, 84 and 86 are located on the body of a vehicle 500. The markers 80, 82, 84 and 86 can each be detected by three points (the three apexes of each respective triangle).

Figure 12:
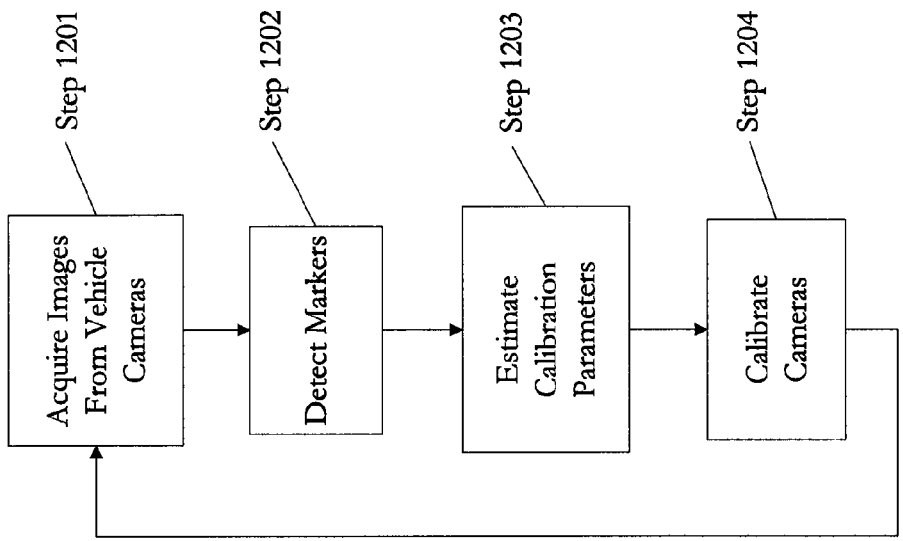
FIG. 12 is a flow chart of a methodology for calibrating vehicle cameras in accordance with an exemplary aspect of the disclosure.

With the markers placed on the vehicle, the calibration can be performed continuously such that each image that is taken provides calibration information. Thus, subtle camera dynamics due to vibrations can be accounted for. Such a calibration will now be explained with reference to FIG. 12. In step 1201, images are acquired by the vehicle cameras. For example, the cameras 30, 32, 34 and 36 detect images surrounding the vehicle 500. In step 1202, the calibration markers are detected within each image. For example, the calibration markers 80, 82, 84 and 86 are identified in each image. In step 1203, the calibration parameters are estimated based on the markers identified in step 1202. For example, the location, orientation, and relative position of the each of the cameras is determined. In step 1204, the cameras are calibrated based on the information determined in step 1203.

Obviously, numerous modifications and variations of the present invention are possible in light of the above teachings. It is therefore to be understood that within the scope of the appended claims, the invention may be practiced otherwise than as specifically described herein.

The invention claimed is:

1. An electronic control system for adapting three dimensional panoramic views of vehicle surroundings, comprising:
a plurality of cameras mounted on a vehicle that generate images of a surrounding area of the vehicle, the surrounding area being exterior to the vehicle;
a visual sensor that detects a three dimensional profile of at least a portion of an occupant of the vehicle;
an electronic control unit that is configured to:
generate a three dimensional panoramic view of the surrounding area of the vehicle based on the images generated by the plurality of cameras,
determine three dimensional locations and orientations of one or more body parts of the occupant of the vehicle based on the three dimensional profile detected by the visual sensor,
determine movement of the one or more body parts by determining a velocity or an acceleration of the one or more body parts based on the three dimensional locations and orientations, and
adapt the three dimensional panoramic view of the surrounding area of the vehicle based on the movement of the one or more body parts of the occupant; and
a display unit to output a display of the adapted three dimensional panoramic view.

2. The electronic control system according to claim 1, wherein the electronic control unit is configured to predict the vehicle occupant's intentions relating to operation of the vehicle based on the determined three dimensional locations and orientations, and the electronic control unit is configured to adapt the three dimensional panoramic view based on the predicted vehicle occupant's intentions.

3. The electronic control system according to claim 2, wherein the electronic control unit is configured to assess potential risks that relate to the vehicle's proximity to other objects, and the electronic control unit is configured to adapt the three dimensional panoramic view based on the assessed potential risks.

4. The electronic control system according to claim 3, wherein the electronic control unit is configured to determine a potential risk exists by performing object recognition on the images generated by the plurality of cameras.

5. The electronic control system according to claim 1, wherein the electronic control unit is configured to generate the three dimensional panoramic view by:

creating a two dimensional panoramic reconstruction by stitching together views from each of the plurality of cameras, generating a three dimensional panoramic image by projecting the two dimensional panoramic reconstruction on a three dimensional shape, and generating the three dimensional panoramic view based on a virtual perspective viewpoint of the three dimensional panoramic image.

6. The electronic control system according to claim 5, wherein the electronic control unit is configured to adapt the three dimensional panoramic view by changing the virtual perspective viewpoint.

7. The electronic control system according to claim 5, wherein the electronic control unit is configured to adapt the three dimensional panoramic view by changing the three dimensional shape on which the two dimensional panoramic reconstruction is projected.

8. The electronic control system according to claim 1, wherein the electronic control unit is configured to calibrate the plurality of cameras by detecting markers mounted on an exterior of the vehicle body, which are detected in the images generated by the plurality of cameras.

9. The electronic control system according to claim 1, wherein the visual sensor is a three dimensional time of flight camera.

10. A method for adapting three dimensional panoramic views of vehicle surroundings, comprising:

generating images of a surrounding area of a vehicle with a plurality of cameras mounted on the vehicle, the surrounding area being exterior to the vehicle;

detecting a three dimensional profile of an occupant of the vehicle with a visual sensor mounted on the vehicle;

generating a three dimensional panoramic view of the surrounding area of the vehicle based on the images generated by the plurality of cameras;

determining three dimensional locations and orientations of one or more body parts of the occupant of the vehicle based on the three dimensional profile detected by the visual sensor;

determining movement of the one or more body parts by determining a velocity or an acceleration of the one or more body parts based on the three dimensional locations and orientations;

adapting the three dimensional panoramic view of the surrounding area of the vehicle based on the movement of the one or more body parts of the occupant; and outputting a display of the adapted three dimensional panoramic view.

11. The method according to claim 10, further comprising predicting the vehicle occupant's intentions relating to operation of the vehicle based on the determined three dimensional locations and orientations, wherein the adapting the three dimensional panoramic view includes adapting the three dimensional panoramic view based on the predicted vehicle occupant's intentions.

12. The electronic control system according to claim 10, wherein the generating the three dimensional panoramic view includes:

creating a two dimensional panoramic reconstruction by stitching together views from each of the plurality of cameras, generating a three dimensional panoramic image by projecting the two dimensional panoramic reconstruction on a three dimensional shape, and generating the three dimensional panoramic view based on a virtual perspective viewpoint of the three dimensional panoramic image.

13. The electronic control system according to claim 10, further comprising calibrating the plurality of cameras by detecting a plurality of markers on an exterior of a body of the vehicle in the images generated by the plurality of cameras.

14. The electronic control system according to claim 13, wherein calibrating the cameras includes detecting one of the plurality of markers in two different images that are respectively generated by two different cameras of the plurality of cameras.

15. An electronic control unit for adapting three dimensional panoramic views of vehicle surroundings, comprising:

a data acquisition circuit configured to receive a plurality of images of a surrounding area of the vehicle and a three dimensional profile of an occupant of a vehicle, the surrounding area being exterior to the vehicle;

a data processor configured to:

generate a three dimensional panoramic view based on the plurality of images, determine three dimensional locations and orientations of a plurality of body parts of an occupant of a vehicle based on the three dimensional profile, determine movement of the body parts by determining a velocity or an acceleration of the body parts based on the three dimensional locations and orientations, and adapt the three dimensional panoramic view based on the movement of the body parts; and a display circuit configured to output display information corresponding to the adapted three dimensional panoramic view.

16. An electronic control system for adapting the three dimensional panoramic views of vehicle surroundings, comprising:

a plurality of cameras mounted on a vehicle that generate images of a surrounding area of the vehicle, the surrounding area being exterior to the vehicle;

a plurality of calibration markers mounted on an exterior of a body of the vehicle;

an electronic control unit that is configured to:

generate a three dimensional panoramic view of the surrounding area of the vehicle based on the images generated by the plurality of cameras, calibrate the plurality of cameras by detecting the calibration markers in the images of the surrounding area of the vehicle generated by the plurality of cameras, determine movement of one or more body parts of an occupant of the vehicle by determining a velocity or an acceleration of the one or more body parts based on three dimensional locations and orientations of the one or more body parts, and adapt the three dimensional panoramic view of the surrounding area of the vehicle based on the movement of the one or more body parts of the occupant of the vehicle.

17. The electronic control system according to claim 16, wherein the electronic control unit continuously calibrates the cameras each time the plurality of cameras generate images.

18. The electronic control system according to claim 16, wherein the plurality of calibration markers and the plurality of cameras are positioned such that adjacent cameras have overlapping fields of view that share at least one calibration marker of the plurality of calibration markers in common.

19. The electronic control system according to claim 16, wherein each calibration marker includes a geometry that includes more than a single corner and a color that provides contrast with a background on which the calibration marker is mounted.

* * * * *